United States Patent
Rajendranath

(10) Patent No.: US 11,944,047 B2
(45) Date of Patent: Apr. 2, 2024

(54) AUTOMATED DATA-BASED IRRIGATION SYSTEM AND METHOD

(71) Applicant: Darren Rajendranath, Tallahassee, FL (US)

(72) Inventor: Darren Rajendranath, Tallahassee, FL (US)

(*) Notice: Subject to any disclaimer, the term of this patent is extended or adjusted under 35 U.S.C. 154(b) by 0 days.

(21) Appl. No.: 17/489,971

(22) Filed: Sep. 30, 2021

(65) Prior Publication Data

US 2022/0015310 A1  Jan. 20, 2022

Related U.S. Application Data

(63) Continuation-in-part of application No. 16/683,523, filed on Nov. 14, 2019, now abandoned, which is a continuation of application No. 15/422,551, filed on Feb. 2, 2017, now abandoned.

(60) Provisional application No. 62/360,753, filed on Jul. 11, 2016.

(51) Int. Cl.
| | | |
|---|---|---|
| *A01G 25/00* | (2006.01) | |
| *A01G 25/16* | (2006.01) | |
| *B64C 39/02* | (2023.01) | |
| *G05D 1/00* | (2006.01) | |
| *B64U 10/13* | (2023.01) | |
| *B64U 101/30* | (2023.01) | |

(52) U.S. Cl.
CPC ......... *A01G 25/165* (2013.01); *A01G 25/167* (2013.01); *B64C 39/024* (2013.01); *G05D 1/0094* (2013.01); *B64U 10/13* (2023.01); *B64U 2101/30* (2023.01)

(58) Field of Classification Search
None
See application file for complete search history.

(56) References Cited

U.S. PATENT DOCUMENTS

| | | | |
|---|---|---|---|
| 2016/0255763 A1* | 9/2016 | Canyon | A01B 79/005 |
| 2017/0045894 A1* | 2/2017 | Canoy | G08G 5/0013 |
| 2018/0101173 A1* | 4/2018 | Banerjee | G06T 7/70 |
| 2022/0024588 A1* | 1/2022 | Wake | B64D 27/24 |

* cited by examiner

*Primary Examiner* — Paul B Yanchus, III
(74) *Attorney, Agent, or Firm* — J. Wiley Horton

(57) ABSTRACT

A system and method for obtaining real-time data regarding the condition of a crop and planning and executing an irrigation cycle in response to the data. The invention uses an unmanned aerial vehicle to survey the conditions within an irrigated area. The unmanned aerial vehicle is operated from a base station mounted on the boom assembly of a pivot irrigation system. The inventive system determines a position for the base station and uses that position to land the UAV.

20 Claims, 15 Drawing Sheets

AUTOMATED DATA-BASED IRRIGATION SYSTEM AND METHOD

CROSS-REFERENCES TO RELATED APPLICATIONS

This non-provisional patent application is a continuation-in-part of U.S. patent application Ser. No. 16/683,523. The parent application lists the same inventor.

STATEMENT REGARDING FEDERALLY SPONSORED RESEARCH OR DEVELOPMENT

Not applicable

MICROFICHE APPENDIX

Not applicable

BACKGROUND OF THE INVENTION

1. Field of the Invention

This invention relates to the field of agriculture. More specifically, the invention comprises a system and method for obtaining real-time data regarding the condition of a crop and planning and executing an irrigation cycle in response to the data.

2. Description of the Related Art

The present invention is applicable to a wide variety of irrigation systems and should not be viewed as being limited to any one type. However, it is useful for the reader to have some background knowledge of a particular type of irrigation system so that the invention's application to that type can be explained in detail. "Center pivot" irrigation systems are now quite common throughout the world, and this type will be used in the examples provided.

FIGS. 1 through 3 illustrate the components of a typical center pivot system. FIG. 1 shows a perspective view. As the components are relatively large, the vantage point of FIG. 1 represents an "aerial" view from an altitude of about 100 feet. Central pivot structure 12 is located in the center of the circular area to be irrigated. A line of booms (commonly referred to as "spans") is connected to the central pivot structure. Boom assembly 14 connects directly to the central pivot structure. Boom assembly 16 connects to boom assembly 14 at drive tower 20. Boom assembly 18 connects to boom assembly 16 at drive tower 22. Drive tower 24 is located on the outer end of boom assembly 18. End boom 26 (which typically mounts a sweeping nozzle) is also mounted to drive tower 24.

Water is pumped in through center pivot structure 12 and carried along the boom assemblies. Many spray nozzles are mounted along the boom assemblies. These nozzles distribute the water. The drive towers include geared drive motors (typically electric motors) that slowly move the booms around the irrigation circle. While a detailed discussion of the operation of center pivot systems is beyond the scope of this disclosure, the reader may wish to know a few basic facts about their operation. In many systems, the outermost drive tower is driven at a controlled rate. The inner drive towers are simply "keyed" off the motion of the outer drive tower. For instance, boom assembly 18 is joined to boom assembly 16 across a flexible joint near the top of drive tower 22. This flexible joint includes an angular sensor. The angular sensor "trips" when boom assembly 18 exceeds a small angle with respect to boom assembly 16 (the two booms become non-parallel). When this sensor trips the drive within drive tower 22 is activated and drive tower 22 drives in the same direction as drive tower 24. In this example all the drive towers operate at the same linear speed. However, since drive tower 22 is running along a smaller circle than drive tower 24, it will soon overtake the angular position of drive tower 24. This will be sensed by the fact that boom assembly 16 again becomes parallel with boom assembly 18 (or nearly so). Drive tower 22 will then be shut off until the angular sensor on the flexible joint on drive tower 22 again senses that the boom assemblies are non-parallel.

The same type of angular sensor is provided on the flexible joint at drive tower 20. In this operational scheme, drive tower 24 is activated for a fixed period and drives at a set rate. Drive towers 20 and 22 periodically activate to drive forward and keep the boom assemblies parallel. The result is that the three aligned booms pivot around central tower structure 12. They act as a single linear structure.

FIG. 2 shows center pivot structure 12 and boom assembly 14 in more detail. The vertical water feed pipe on the center pivot structure is connected to elbow 30 via collector ring 28. The collector ring allows the pressurized water to be transferred through a freely-rotating joint. The collector ring also often includes a rotating connection for electrical power (such as 440 VAC) and electrical control circuitry (110 VAC or sometimes low-voltage DC).

Pipe 34 is connected to elbow 30 via joint 32. The pipe may be arched as shown for greater structural strength. The pipe may be large (such as 10 inches or 25 cm in diameter). The overall length of the boom assembly may be 40 feet (2+ meters). The weight of the water carried in the pipe is quite significant (about 1,400 pounds or 640 kg). The bending forces on so slender a structure are also significant. Thus, these systems typically include reinforcing structure. The pipe shown in FIG. 2 includes a series of truss assemblies 36. The outer portions of the truss assemblies are connected by guy wires 38. These guy wires are tensioned to add strength and rigidity to the overall structure.

The outer portion of pipe 34 is joined to the next pipe via flex joint 50 on top of drive tower 20. Drive tower 20 includes a pair of drive wheels 42 that are driven by an electric gear motor. The drive tower may also include a small sprinkler boom that is perpendicular to pipe 34. This small boom mounts one or more sprinkler heads that are used to irrigate areas within the arc of the drive tower's motion.

Most of the irrigation provided comes from pipe 34 itself. A series of U-couplings 44 come off the top of the pipe. Each of these couplings is connected to a pendant 46. Each pendant includes a liquid dispenser of some type (in this case sprinkler head 48 located near its lower end). Each pendant also typically includes a weight to hold the pendant steady. In operation, pressurized water leaves the pipe through the U-couplings, descends through the attached pendants, and sprays out through the sprinkler heads onto the crop.

FIG. 3 shows the same assembly in a plan view. Irrigation circle 52 is centered on center pivot structure 12. Boom assembly 14 covers inner boom area 60. Boom assembly 16 covers middle boom area 58. Boom assembly 18 covers outer boom area 56. End boom 26 covers end boom area 54. Those skilled in the art will know that most such systems have more than three boom assemblies. It is more common for such systems to have many more boom assemblies (such as ten boom assemblies). However, the principles of operation are the same for the larger versions.

Those skilled in the art will also know that such irrigation systems may be used to carry more than just water. Many other things may be dissolved in (or carried by) the water. These other things include fertilizers and pesticides.

FIG. 4 shows a prior art unmanned aerial vehicle 62 ("UAV" or "drone"). UAV's come in many different configurations and the invention is by no means limited to any particular configuration. The version shown includes four separate powered rotors 66. Frame 64 surrounds and guards the rotors. Landing gear 70 in this version comprise four spring steel legs—each of which includes a soft landing pad.

Sensor array 68 is mounted to the bottom of UAV 62 and is oriented in a downward direction. The sensor array may include a wide variety of passive and active sensors. As one example, a short wavelength infrared ("SWIR") sensor has been found useful in determining the moisture content of crops being surveyed. The sensor array may contain one or more SWIR receptors.

The present invention uses the UAV to survey the soil and/or crop growing (and more specifically the crop canopy) within an irrigated area. The invention then uses the data obtained to tailor an irrigation cycle for the irrigated area.

BRIEF SUMMARY OF THE INVENTION

The present invention comprises a system and method for obtaining real-time data regarding the condition of a crop and planning and executing an irrigation cycle in response to the data. The invention uses an unmanned aerial vehicle to survey the conditions within an irrigated area. The unmanned aerial vehicle is operated from a base station mounted on the boom assembly of a pivot irrigation system. The inventive system determines a position for the base station and uses that position to land the UAV.

The irrigation system includes components to vary the amount of water dispensed within particular areas known as "zones." The data obtained is used to create an irrigation schedule that the irrigation system then carries out (often known as "zone management"). For example, surveyed areas that contain more moisture may be given relatively less water during the next irrigation cycle. The data obtained may also be used to alter a scheduled delivery of fertilizer, pesticide, or some other substance.

Figure 1:
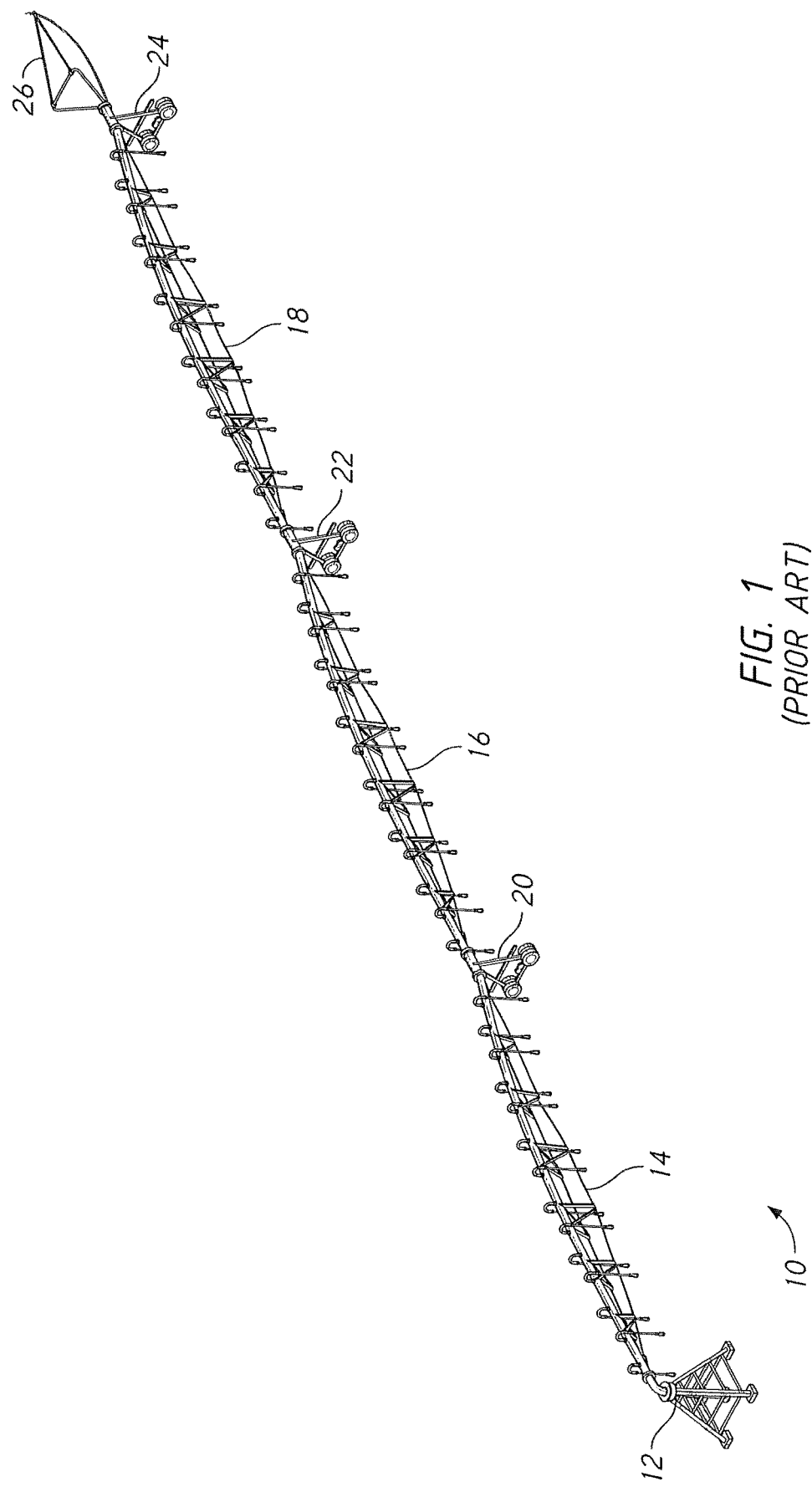
FIG. 1 is a perspective view, showing a prior art center pivot irrigation system.

REFERENCE NUMERALS IN THE DRAWINGS 10 center pivot irrigation system
12 central pivot structure
14 boom assembly
16 boom assembly
18 boom assembly
20 drive tower
22 drive tower
24 drive tower
26 end boom
28 collector ring
30 elbow
32 joint
34 pipe
36 truss assembly
38 guy wire
42 drive wheel
44 U-coupling
46 pendant
48 sprinkler head
50 flex joint
52 irrigation circle
54 end boom area
56 outer boom area
58 middle boom area
60 inner boom area
62 unmanned aerial vehicle
64 frame
66 rotor
68 sensor array
70 landing gear
72 UAV landing pad
74 mounting chassis
76 cover
78 hinge
80 actuator
82 target
84 control cable
86 outlet
88 valve
90 connector
92 mildly dry region
94 moderately dry region
96 oversaturated region
98 UAV base station
100 flight path
102 transceiver
104 CPU/memory
106 sprinkler coverage arc
108 wheel tracks
110 GPS unit
112 GPS unit
114 boom assembly
116 boom assembly 118 drive tower
120 drive tower
122 reference axis
124 pivot system controller
126 power input line
128 power line
130 power line
132 data link
134 power/data link
136 boom axis
142 power line modulation unit
144 processor
148 R/F module
150 antenna
152 I/O port
154 power line modulation unit
156 battery
158 charge module
162 power supply
164 power/data line
166 power line modulation unit
168 processor
170 charging system
172 R/F module
174 antenna
176 I/O port
178 I/O port
180 processor

DETAILED DESCRIPTION OF THE INVENTION

The present invention seeks to use real-time or near-real-time data collected by an unmanned aerial vehicle ("UAV") to modify the application of water and waterborne substances through an irrigation system. The invention can be used with any desired type of irrigation system. However, since a center pivot system was used for the description of the prior art, the embodiments disclosed hereafter pertain to a center pivot system.

Figure 2:
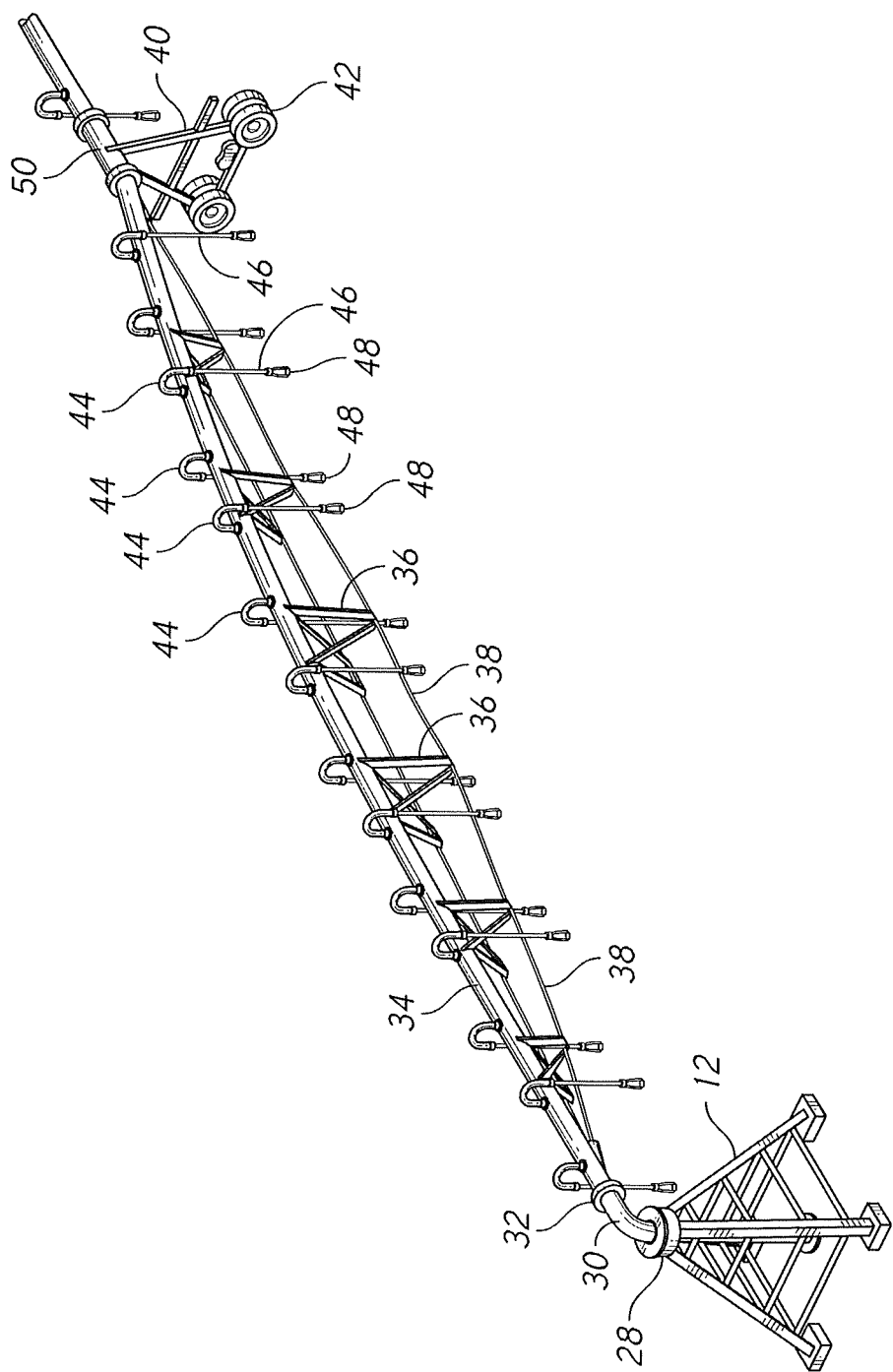
FIG. 2 is a detailed perspective view, showing the center pivot structure and the first boom assembly of the system from FIG. 1.
Figure 3:
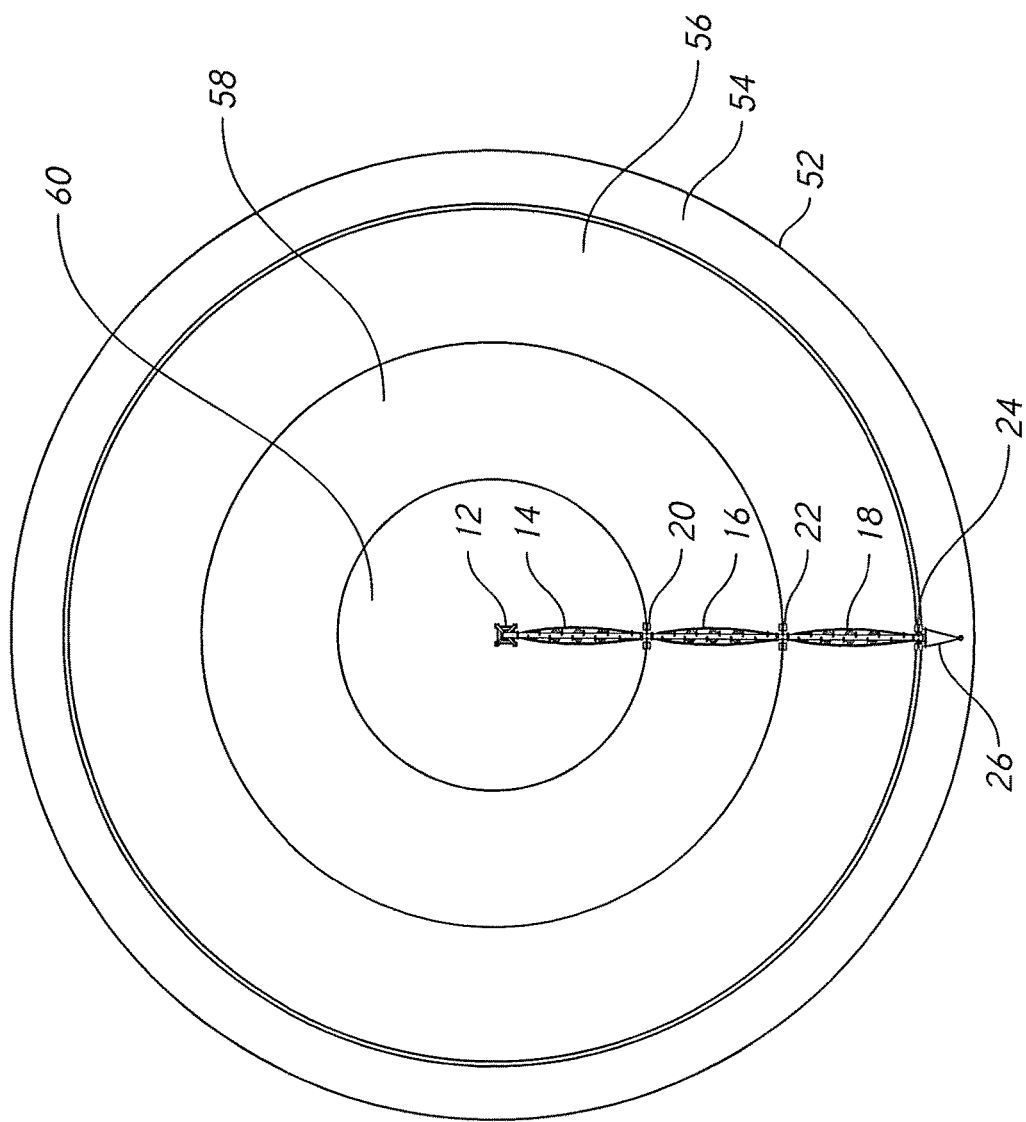
FIG. 3 is a plan view, showing the system from FIG. 1.
Figure 4:
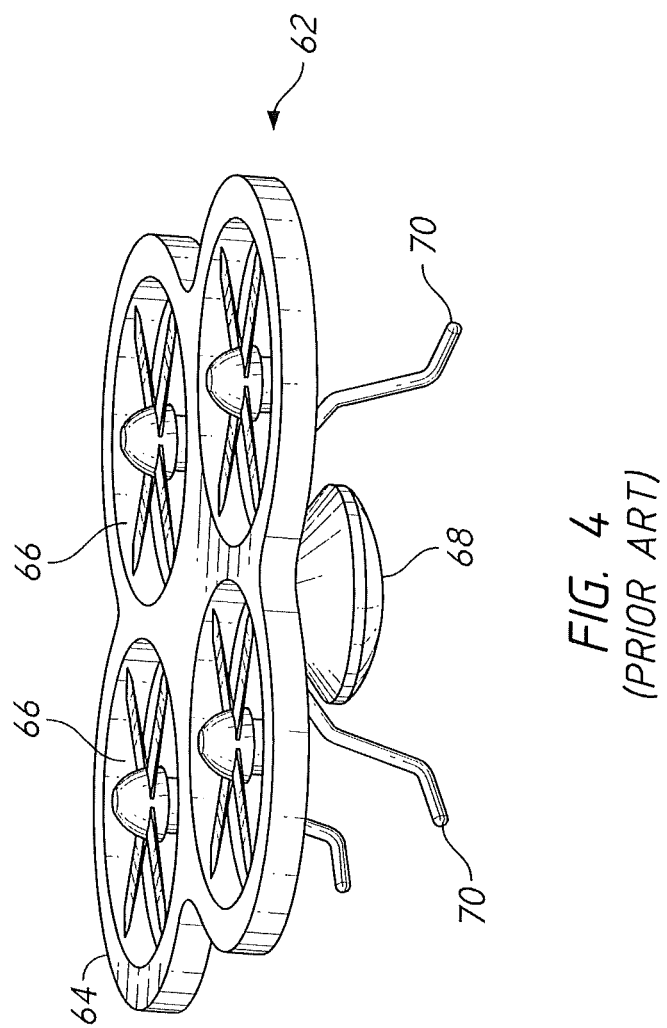
FIG. 4 is a perspective view, showing a prior art UAV.
Figure 5:
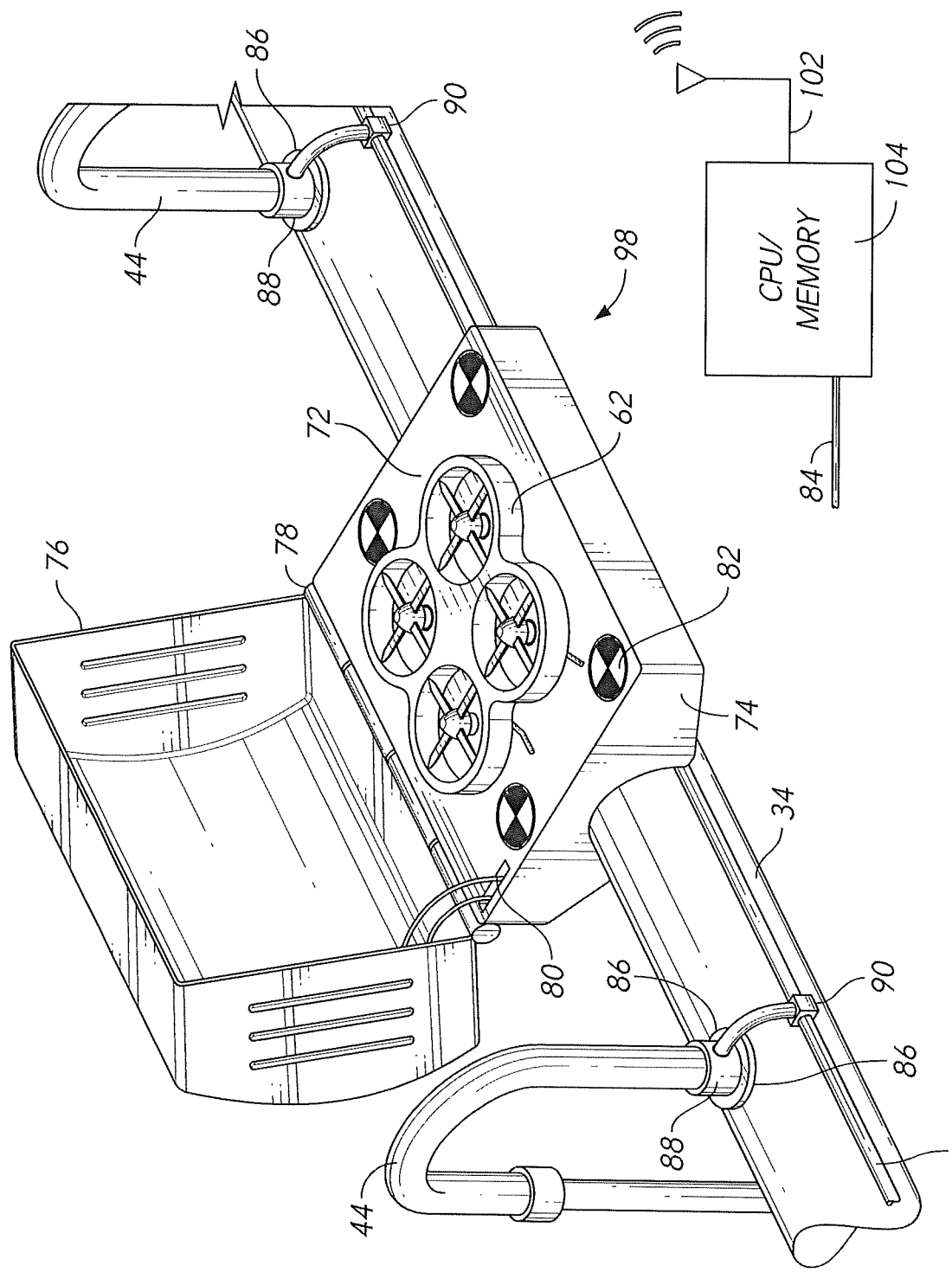
FIG. 5 is a detailed perspective view, showing a UAV base station as used in some embodiments of the present invention.

The UAV is preferably stored on or near the irrigation area to be surveyed so that it does not waste time in transit. A landing pad and housing could be provided on a pole near the field. However, since the irrigation system already provides a substantial structure, it is preferable to use this structure to house the UAV. Returning briefly to FIG. 2, the reader will recall that a boom assembly of a center pivot system includes a large pipe 34. FIG. 5 shows an enlarged view of UAV base station 98 mounted on pipe 34.

The UAV base station includes a flat UAV landing pad 72 atop a mounting chassis 74. The mounting chassis in this version is attached to pipe 74 using two metal straps. Cover 76 pivots down over UAV landing pad 72 (via hinge 78). Actuator 80 moves the cover between the open position (shown) and a closed position where it completely covers the UAV landing pad.

Targets 82 are provided to guide the UAV onto the pad. The targets in this example are areas of contrasting color contained within a circle. These are useful for visual guidance systems. There are many known UAV guidance systems and the invention is not limited to any particular one. However, in this version, a GPS receiver on board the UAV is used to guide it to a position just over the landing pad. A digital vision system in the UAV's sensor array then looks for the targets 82 and uses these to guide the UAV to a landing in the center of the pad. Once the UAV has landed, actuator 80 closes cover 76 over the UAV in order to protect it. The UAV remains under the cover when not in use and is thereby protected from sun, wind, and rain.

The UAV landing pad preferably includes an inductive charging system that recharges the UAV's internal batteries as the UAV sits on the pad. Energy may be provided from a solar panel or panels on top of cover 76. However, as power is typically provided along the boom assembly, this power may be tapped to recharge the UAV batteries. For example, control cable 84 typically carries a low-power DC signal with sufficient capacity to recharge the UAV batteries. IN still other examples—described subsequently—AC line power is carried along the booms and this can be used to power the UAV landing pad as well.

FIG. 5 shows additional details of an irrigation system modified according to the present invention. In the prior art, each U-coupling 44 is connected to an outlet 86 along the top of pipe 34. In the inventive embodiment shown, a valve 88 controls the flow of liquid from outlet 86 into U-coupling 44 (and from thence to the attached sprinkler head or heads). Each valve 88 is in turn connected by a connector 90 to control cable 84. Control cable 84 contains multiple conductors.

Control cable 84 is connected to CPU/memory 104. The CPU (central processing unit)/memory may be remotely located or may be part of a control box assembly mounted on center pivot structure 12. It is attached to a transceiver 102 configured to communicate with the UAV.

In operation, the UAV flies a pattern to collect data in the irrigation area. The UAV or its associated landing station then transfers the data collected to CPU/memory 104 via transceiver 102. The CPU/memory then uses the data to create a desired operating scheme for the irrigation system as a whole and valves 88 in particular. Some exemplary operating schemes will now be described in more detail.

Figure 6:
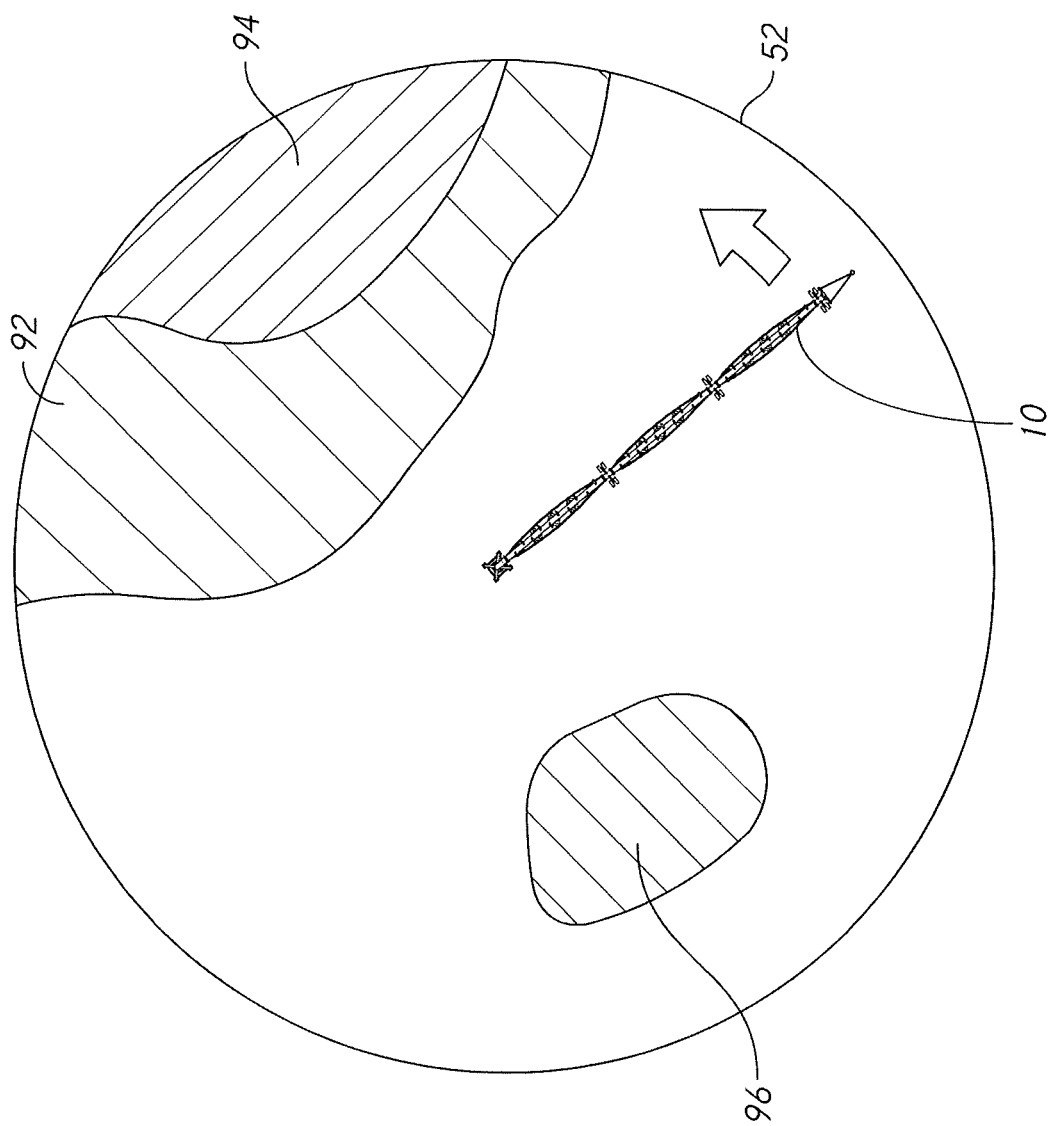
FIG. 6 is a plan view, showing some exemplary survey data.

FIG. 6 shows a possible state for irrigation circle 52. The moisture content of the soil and/or crop within the circle is not evenly distributed. Oversaturated region 96 exists, as do mildly dry region 92 and moderately dry region 94. Prior art irrigation systems are typically designed to provide a uniform distribution of water. If this is done in the field shown in FIG. 6, some regions will be overwatered and others will be underwatered.

Figure 7:
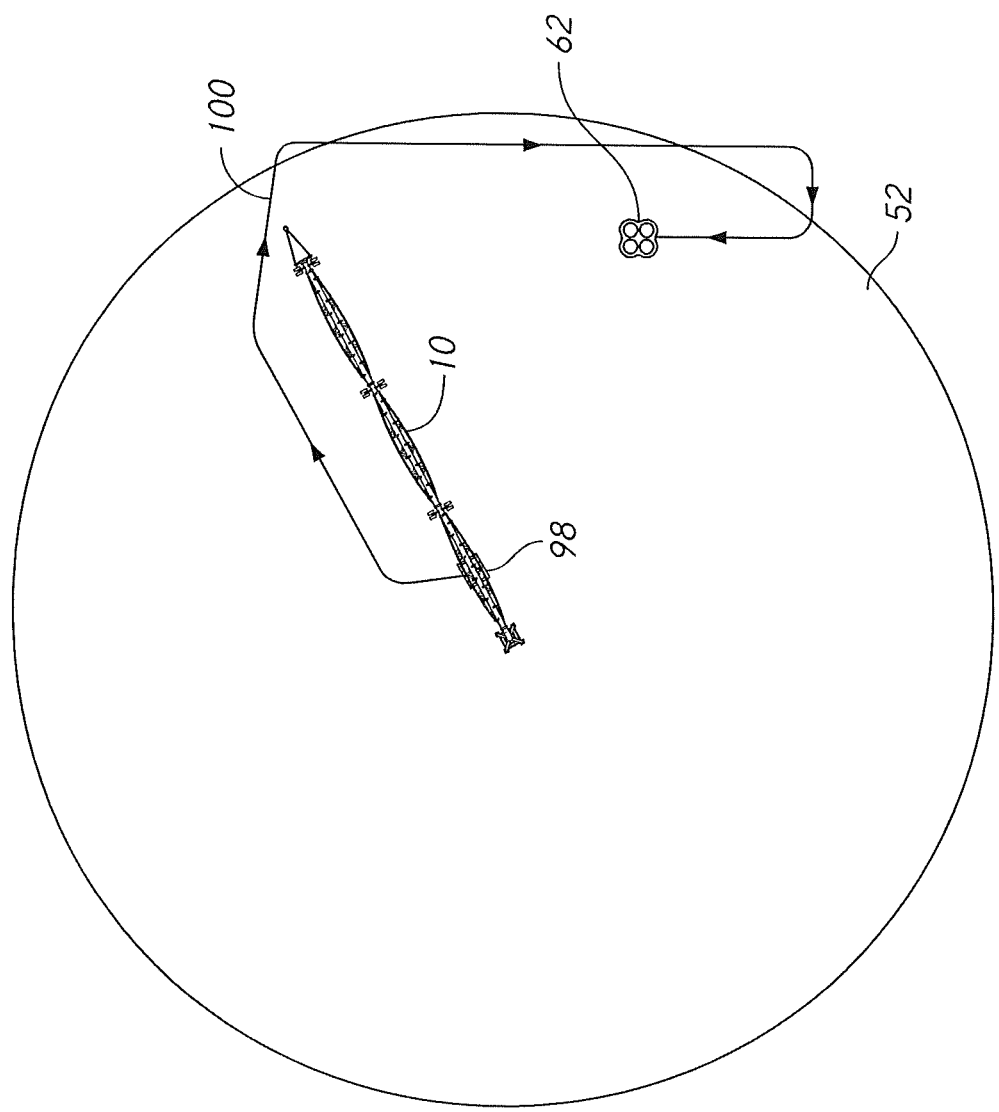
FIG. 7 is a plan view, showing an exemplary survey pattern.

Shortly before an irrigation cycle is initiated, the UAV is dispatched to survey the irrigation circle. FIG. 7 shows this operation. UAV 62 flies away from UAV base station 98 and flies along flight path 100. Flight path 100 is typically a prescribed pattern that provides good coverage of irrigation circle 52 (The irrigation circle is the irrigation area in question for a center pivot system. In other system types the irrigation area will not be a circle). In the example shown, the pattern is a series of parallel paths.

Existing flight planning software may be used to create a desired flight pattern and the present invention is by no means limited to any one pattern. If, for example, GPS data is unavailable on a particular day, the UAV may be equipped with a computer vision system that allows it to fly a pattern based on the wheel tracks of the irrigation system itself. Switching to vision-based information may also suggest the desirability of a different flight pattern and such a flight pattern can be stored in memory for use when needed.

The UAV may use any desired sensor or sensors. As one example, the SWIR return serves as a good proxy for moisture content. The UAV may use a SWIR sensor to gather data. The UAV correlates this data with GPS-based positional data and preferably time data as well. In other words, each datum point would have a SWIR value, a GPS position value, and a time value.

The UAV then downloads the data acquired to CPU/memory 104. Software running on the CPU then analyzes the data. Positional accuracy is important for this analysis. It may be desirable to provide a "reference GPS receiver" that is located on a point fixed by an accurate survey. Such a point is preferably near the field. The signal from this reference GPS receiver may be used to determine the existence of any positional errors in the GPS system on board the UAV at any time. These positional errors may then be backed out of the GPS data.

A simple example will explain this process. The reference location for the reference GPS receiver is very accurately surveyed. The reference receiver is then fixedly attached to this point. If the reference receiver receives and decodes a GPS signal indicating that it is 2 meters west of its known position, then the software running on the CPU "knows" to move all GPS data taken at that time 2 meters to the east. This technique is well known in the field of surveying and may be used to greatly enhance the accuracy of mobile GPS systems.

Figure 8:
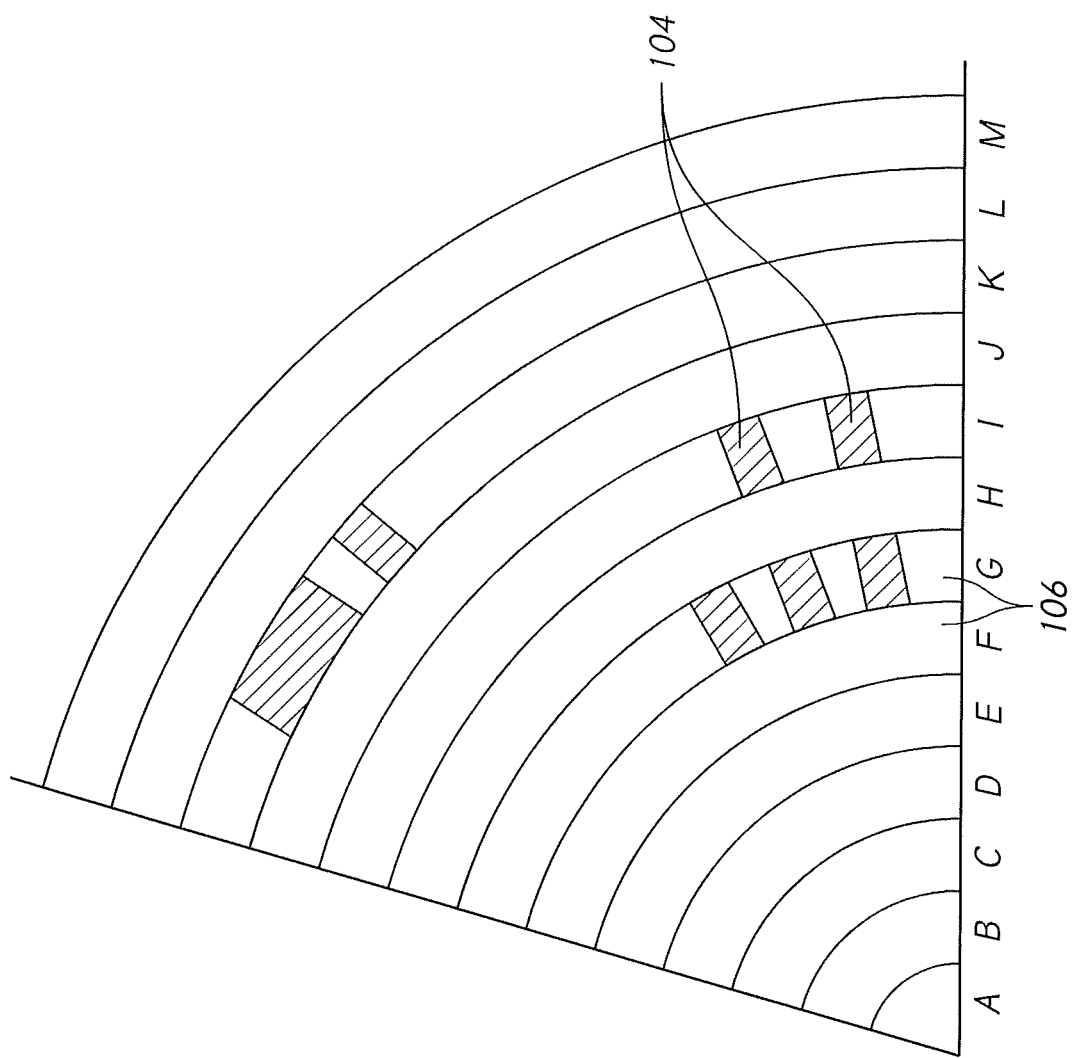
FIG. 8 is a plan view, showing an exemplary irrigation schedule ("zone map")

The software eliminates positional overlaps to create a unified and accurate "snapshot" of conditions within the irrigation circle. This data is then used to create an irrigation schedule or zone map. FIG. 8 shows an exemplary irrigation schedule. A portion of the motion of the boom assembly is shown as an arc in the view. Individual sprinklers are designated as A-M. Each sprinkler covers a sprinkler coverage arc 106. At certain portions during the travel of the booms individual sprinklers are turned off. These are designated as exclusion periods 104 in the view. In this example the valves 88 are simple on/off devices. A maximum saturation for all areas would be achieved by leaving all valves on all the time. A selected reduction in some areas is achieved by turning some valves off some of the time.

In other embodiments a more complicated valve might be employed. This type of valve could have three positions or more (such an off, on-low, and on-high). This would give the system more variability in control.

It is preferable for the UAV to fly a pattern and build a data set immediately before an irrigation cycle begins. That way the very latest information is used. The term "immediately" in this context means within 8 hours and preferably within 1 hour. Even more preferably, the data set is completed within 10 minutes of the initiation of the irrigation cycle.

Figure 9:
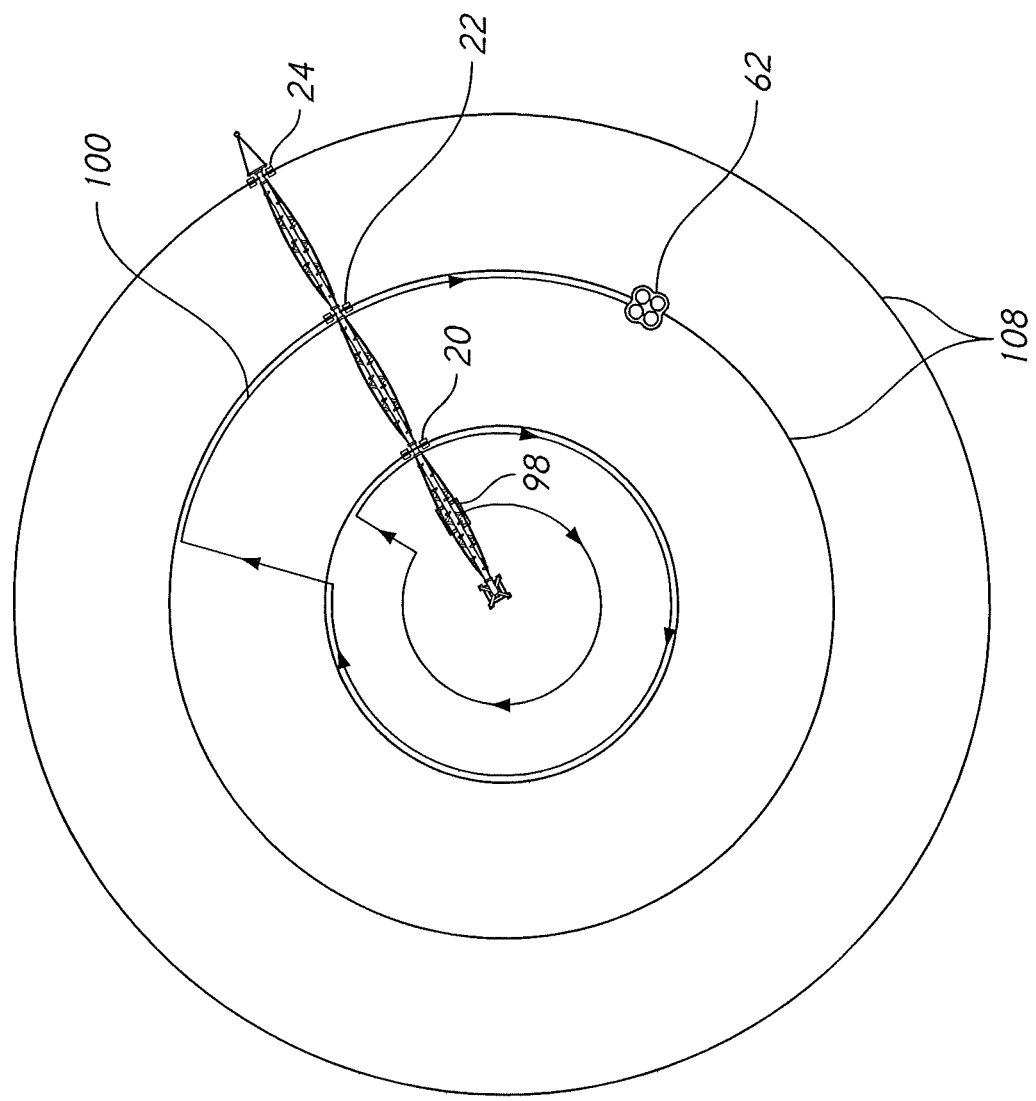
FIG. 9 is a pan view, showing another exemplary survey pattern.

The flight path used for the survey may be driven in different ways. As described previously, GPS data may be used to define the flight path. However, GPS data may not always be available. FIG. 9 shows a plan view of a line of spans using three drive towers 20, 22, 24. As those skilled in the art will know, each drive tower tends to create its own circular wheel track 108. These wheel tracks may be detected by a computer vision system located on the UAV. The UAV may easily follow the wheel track. Flight path 100 in the example of FIG. 9 starts at UAV base station 98 and then follows a wheel track. While the UAV is flying this pattern, it will capture images from an altitude in regards to camera resolution for centering the image based on the wheel track. The image will typically be rectangular. Because the UAV is flying a circular pattern the images should be taken at intervals that will produce an overlap between the edge of one image and the edge of the adjacent image. Images can be stitched together (using software) by connecting and overlapping edges by calculating the angle direction in which the UAV is in regards to the wheel track and previous image captured. This will create multiple point overlap for images in a circular direction. The software can then be used to create a unified data set for the area if desired).

In this example, the UAV includes a digital flux compass that is able to measure the UAV's heading within +/−5 degrees. Once the UAV has followed a wheel track through 330 degrees of heading change, the UAV is programmed to make a 90 degree left turn and proceed outbound until it intersects the next wheel track. The UAV then follows the next wheel track and continues the process. Obviously there are many different ways to use the wheel tracks to guide the survey pattern. Other existing features may be used—such as the boundary between irrigated and non-irrigated regions.

The central processing unit described may assume a wide variety of forms. In general, an irrigation schedule or plan is created by control software running on a processor-based control system. The processor-based system may include a remote server or servers that actually creates the irrigation schedule and then downloads it to a programmable logic controller (including another processor) located on or near the irrigation system itself. Thus, although the control software may be run on a single processor the inventive method described herein may also be carried out using multiple processors that are not in the same location.

Looking again at the irrigation plan of FIG. 8, those skilled in the art will realize that the angular position of the line of irrigation booms is important to the execution of the plan. Returning to FIG. 2, the reader should note that collector ring 28 typically includes an angular position sensor in addition to the other slip rings. This angular position sensor "tells" the control software where the booms are in their slow movement around the irrigation circle. Thus, the control software knows when a particular sprinkler head is passing over a particular arc segment that is scheduled to receive more or less liquid. The control software then modulates the valve feeding that sprinkler head accordingly ("modulation" meaning simply changing the state of flow through the valve).

In the preferred embodiments, the UAV base station is located along the boom assembly. This eliminates the need to create a separate structure. The installation of the UAV base stations is preferably made removable and portable. This allows the UAV to be repositioned where it is needed. The central pivot structure and boom assembly (collectively "pivot irrigation system") tend to remain in one field for many years. However, the field may not always be in use. When a particular pivot irrigation system is not being used, an operator can remove the UAV base station and place it on another pivot irrigation system where it is needed. This will sometimes be true even when a pivot irrigation system is in use. Some operators will not place a UAV base station on every pivot irrigation system—choosing instead to place them only where they are needed and when they are needed.

Figure 10:
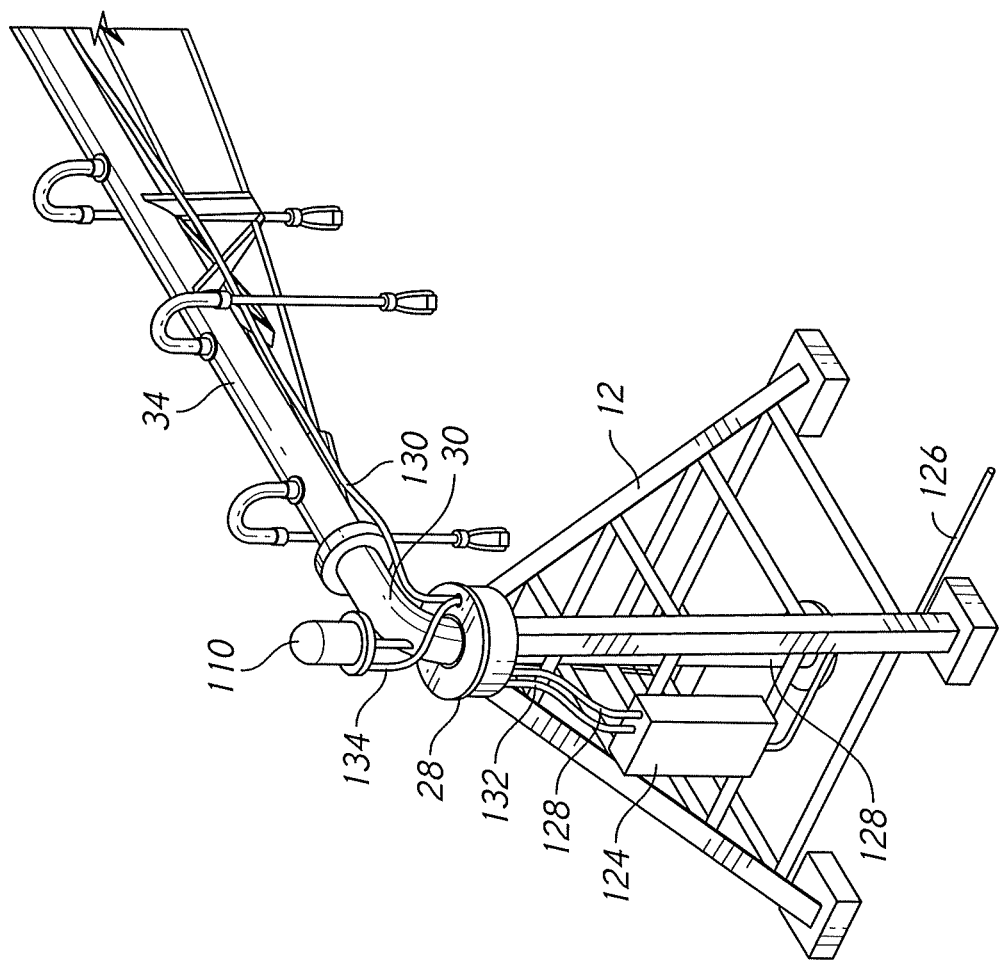
FIG. 10 is a detailed perspective view, showing the area of the central pivot structure.

It is preferable to integrate the UAV and its base station with other components that can be added to the pivot irrigation system. FIG. 10 provides a detailed view of the area of central pivot structure 12. This structure remains static. The pivoting boom assembly (including elbow 30 and all the other components attached thereto) pivots on collar ring 28. Pressurized water is provided to the system via water input line 128. AC line power is provided to the system via power input line 126.

Pivot system controller 124 includes a processor with an associated memory. This processor retrieves and runs software that carries out the functions of the overall assembly. Power line 128 and data line 132 travel up to collar ring 28. A slip ring assembly within collar ring 28 transfers both power and data through the collar ring 28. A slip ring assembly is used because many pivot irrigation systems turn continuously in one direction.

In the example shown, power line 130 carries AC power out along the booms. This power is used by the motors in each drive tower. Data can also be carried on power line 130 (such as by using a power line modulator system). The reader will thereby note that high-capacity electrical power is available along the boom assembly. This is advantageous for the location of the UAV base station.

Many pivot irrigation systems now employ GPS receivers to control the motion of the boom assembly. GPS unit 110 is located above collar ring 28. It is generally located on the axis of rotation. Thus, the orientation of GPS unit 110 changes (it rotates) but its position does not change. Power/data line 134 provides positional data from GPS unit 110 back to pivot system controller 124.

Figure 11:
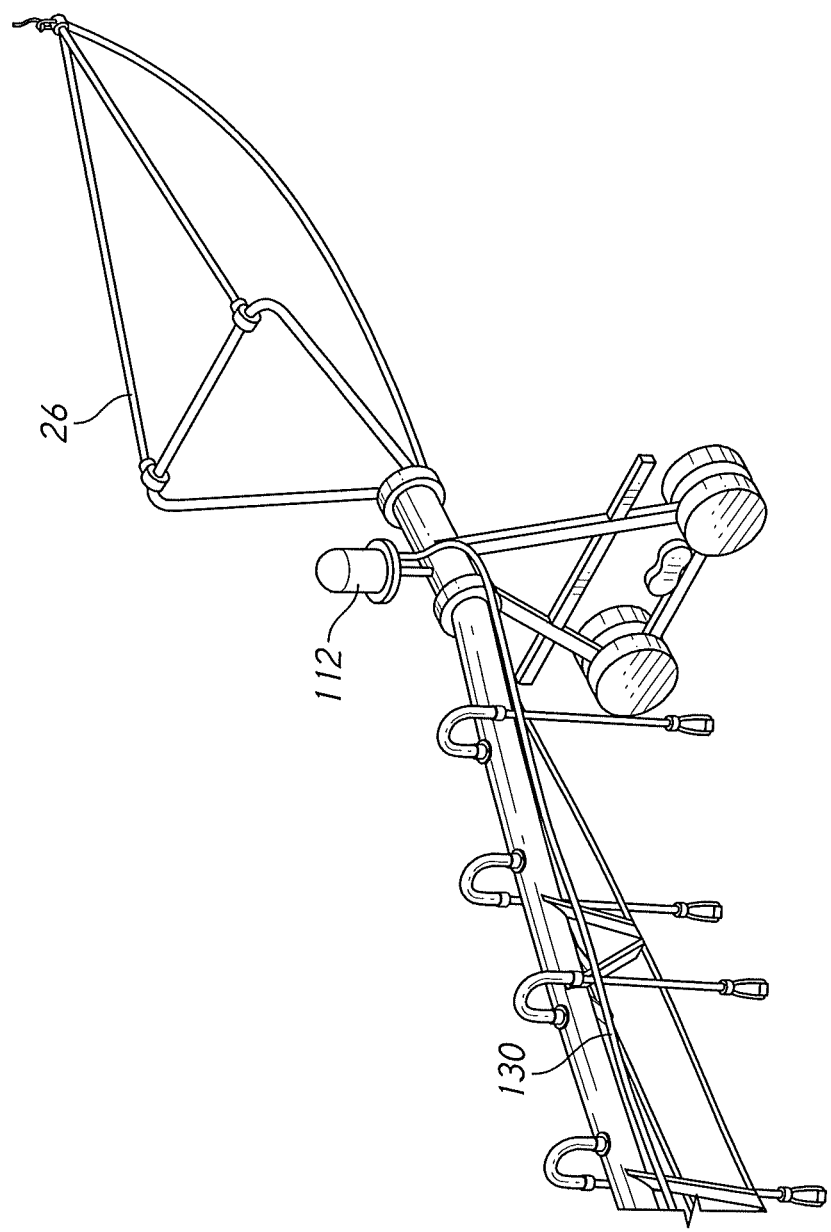
FIG. 11 is a detailed perspective view, showing the outer end of an assembly of multiple booms.

FIG. 11 shows the far end of the boom assembly. A second GPS unit 112 is provided at the far end of the boom assembly, directly over the last drive tower. Data from this second GPS unit 112 can be fed back to controller 124 via a dedicated data line or along power line 130.

Figure 12:
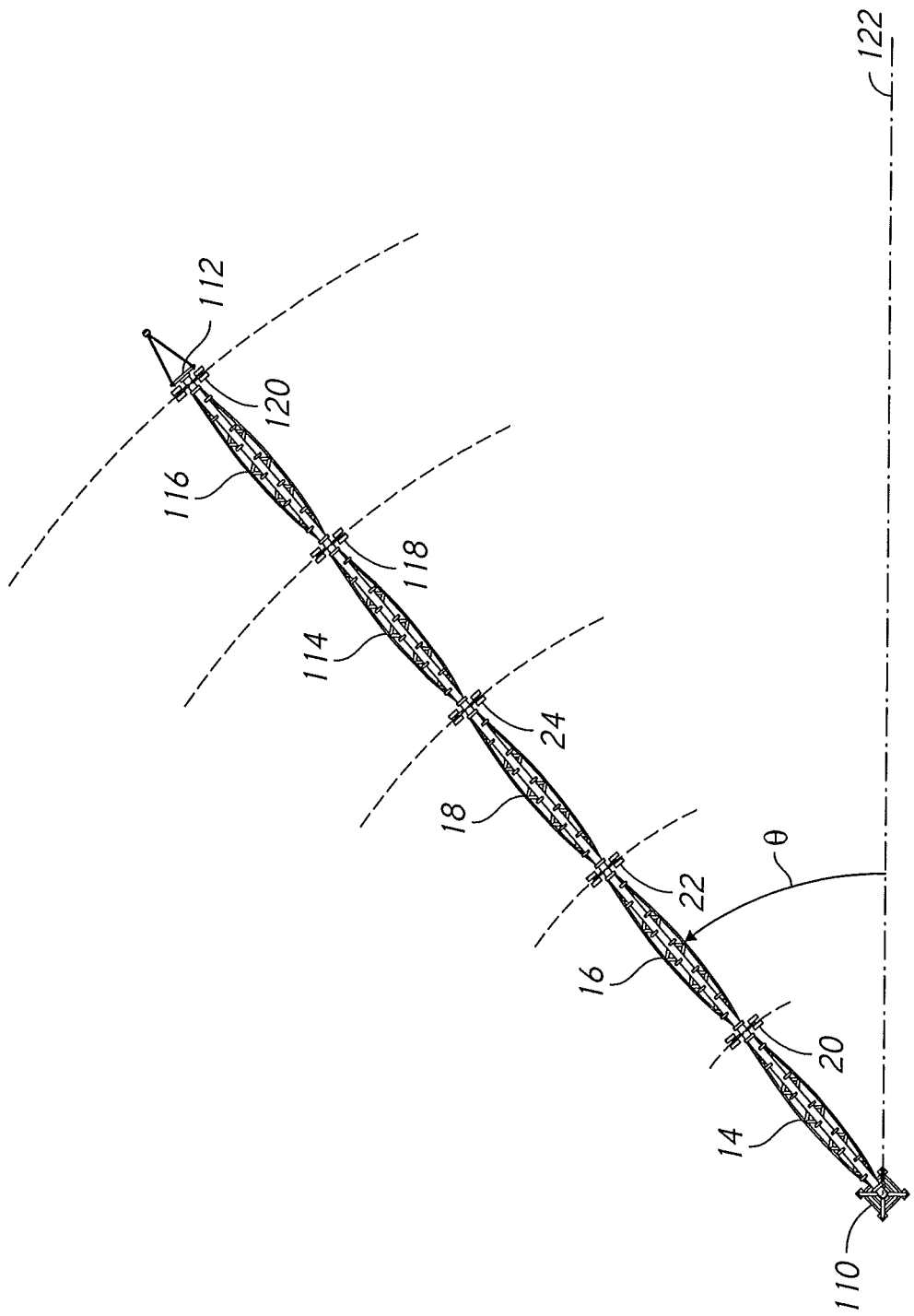
FIG. 12 is a plan view, illustrating methods used to determine the angular position of the boom assembly.

FIG. 12 shows a plan view of a pivot irrigation system in operation. The particular system shown uses five boom assemblies 14, 16, 18, 114, and 116. The central pivot structure is stationary. Drive tower 20 lies at the intersection between boom assemblies 14 and 16. Drive towers 22, 24, 118, and 120 produce the motion needed to drive the assembly.

As those skilled in the art will know, a variety of drive control systems are in use for pivot irrigation assemblies. In most cases, an overall angular velocity is set by pivot system controller 124 driving the motor(s) in drive tower 20 at a first speed. The speed of drive tower 20 determines an angular velocity for boom assembly 14 about the central pivot structure.

In most systems, drive towers 22, 24, 118, and 120 are controlled on the basis of sensors at each joint between adjacent boom assemblies. The sensors sense angular misalignment between neighboring booms and (generally) activate a particular drive tower until alignment is restored. The drive towers operate quite slowly, so this simple method is effective in maintaining the alignment of the boom assemblies.

A simple example will serve to illustrate. Pivot system controller 124 is generally set to provide a percentage of the maximum allowable speed. The geared motors in each drive tower are typically just switched on and off (as opposed to providing some sort of continuously variable speed). The maximum allowable speed in this example is represented by energizing drive tower 20 for 1 second in each 10 second interval. In looking at FIG. 12, drive tower 20 is energized in a direction that rotates boom assembly 14 in a counter-clockwise direction around the central pivot structure.

A boom-to-boom misalignment sensor located at the junction between boom assembly 14 and boom assembly 16 detects misalignment and energizes drive tower 22 to re-align boom 16. The same process occurs when the sensor connecting boom 18 to boom 16 detects misalignment. The result is that the motor in drive tower 20 is driven at a specified duty cycle (such as 1 second in each 10 seconds or 1 second in each 15 seconds), and the other drive towers are controlled to maintain all the boom assemblies in alignment. The outer drive towers will be activated more frequently, since they must drive through a larger circle than the inner ones. While simple, this system actually works quite well.

Provided that the sensors operate properly the boom assemblies will remain nearly parallel at all times—while in operation and while at rest.

Figure 13:
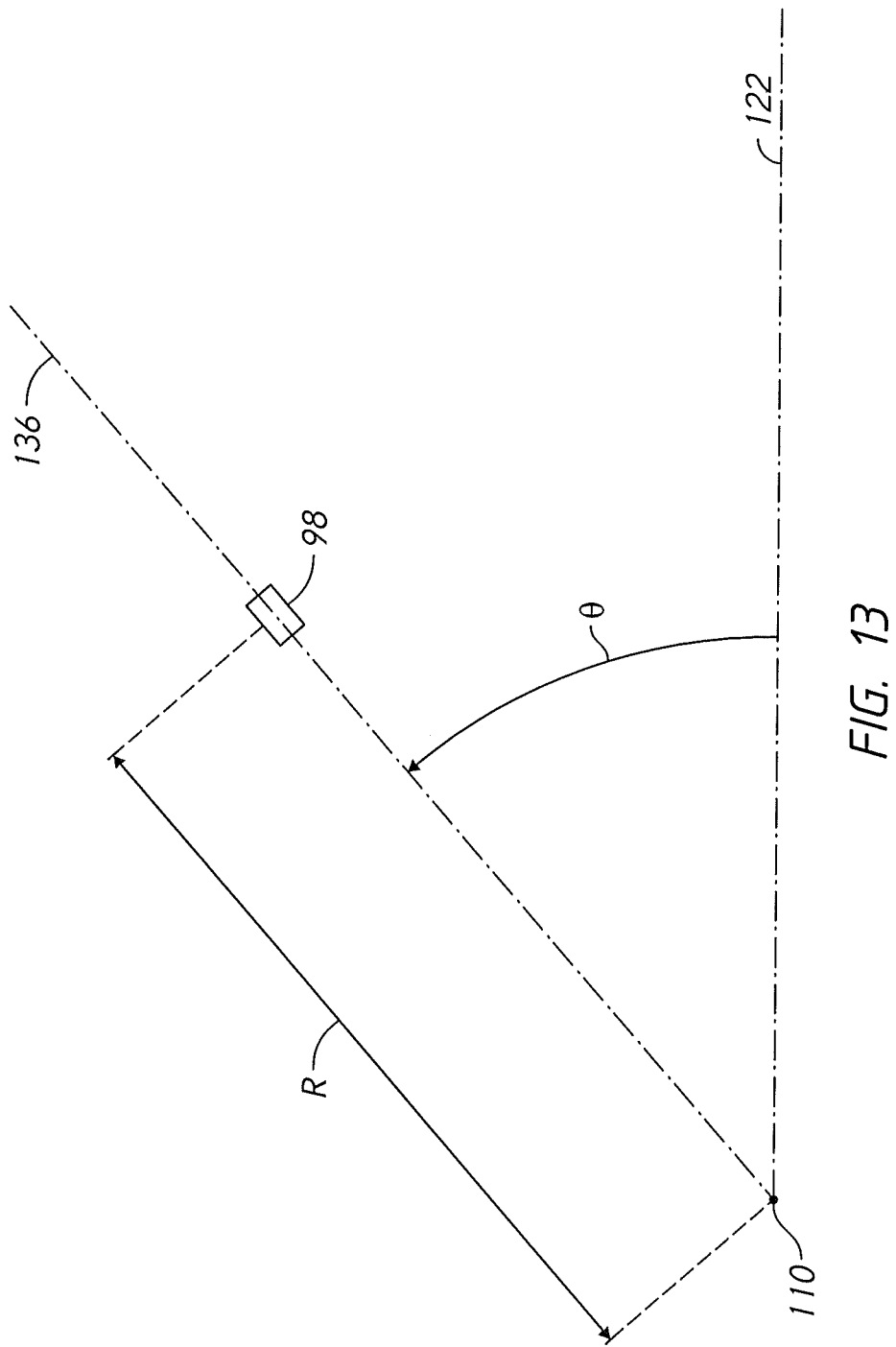
FIG. 13 is a plan view, illustrating methods used to determine the current position of the UAV base station.

While it is convenient to locate the UAV base station on the boom assembly, a problem is apparent. The base station will not remain in a fixed position. Instead, its position moves as the pivot system operates. Its position will not even remain fixed while the UAV is flying. Thus, the UAV cannot simply determine a position before departing and attempt to return to that position. A UAV survey pattern may require a flight of 15 minutes or more. During that time period, the UAV base station can move a considerable distance. For these reasons, it is preferable to provide a system that calculates an anticipated position for the UAV base station. FIGS. 12 and 13 provide an explanation of one embodiment of this calculation system.

Reference axis 122 is defined in the view of FIG. 12. While its position is arbitrary, it is convenient to reference it to central pivot structure 12. The angle $\Theta$ represents the angle between the reference axis 122 and the line formed by the boom assemblies. The pivot system controller can determine this angle using the two GPS units. A first point is determined by GPS unit 110 (on the axis of rotation). A second point is determined by GPS unit 112 on the end of the last boom (see FIG. 11). The control software assumes that the booms lie in a straight line between these two point. The angle $\Theta$ may then be easily determined. Of course, the booms will not lie perfectly along this derived line. However, the positional error is small.

FIG. 13 provides a graphical depiction of the calculation process. Boom axis 136 is a calculated theoretical centerline of the boom assemblies. It is derived from knowledge of the current value for the angle $\Theta$ and the position of reference axis 122 (The reader will recall that GPS unit 110 lies on the axis of rotation for the boom assemblies). UAV base station is affixed to the boom assemblies a distance R from the axis of rotation. The distance R is easily determined by a simple measurement (A tape measure can be used).

The control system can thereafter easily determine a position for UAV base station 98 as follows:
1. The position of GPS unit 110 is known from the data collected by the GPS unit itself. This position is referred to as (Lat1:Long1); and
2. The position of UAV base station 98 is then computed as (Lat1+R sin $\Theta$:Long1−R cos $\Theta$).

Note that the sign convention for longitude in this example uses the positive direction as an increasingly western direction from the prime meridian. Thus, in the position shown in FIG. 13, exemplary values for the longitude of GPS unit 110 and UAV base station 98 could be as follows:

GPS unit 110 84.2815000 degrees West

UAV base station 98 84.2814177 degrees West

GPS unit 110 can in effect become a reference GPS station. Those skilled in the art will know that GPS receivers produce positional errors that vary over time. Some of these errors are deliberately introduced into the GPS satellite system for purposes of national security. Some of these errors are introduced by atmospheric conditions and variations in the synchronization processes within the receivers themselves.

A reference GPS station is a GPS receiver fixed to a known position. The position can be determined by surveying. A GPS receiver on that surveyed position then "knows" its current error because any variation from the surveyed position is assumed to be error. GPS positional errors tend to be constant over a region of a few hectares. Thus, the error experienced by the reference station (GPS unit 110) can be assumed to apply to GPS unit 112 and to the GPS receiver on the UAV itself. This positional error is preferably applied to the sensed GPS positions of the GPS unit 112 and the UAV.

The GPS receivers can also be equipped with the Wide Area Augmentation System ("WAAS"). WAAS provides near real-time positional error correction. WAAS can provide positional error correction even where the position of GPS unit 110 has not been precisely surveyed (though not generally as good as that provided by a reference receiver).

Figure 14:
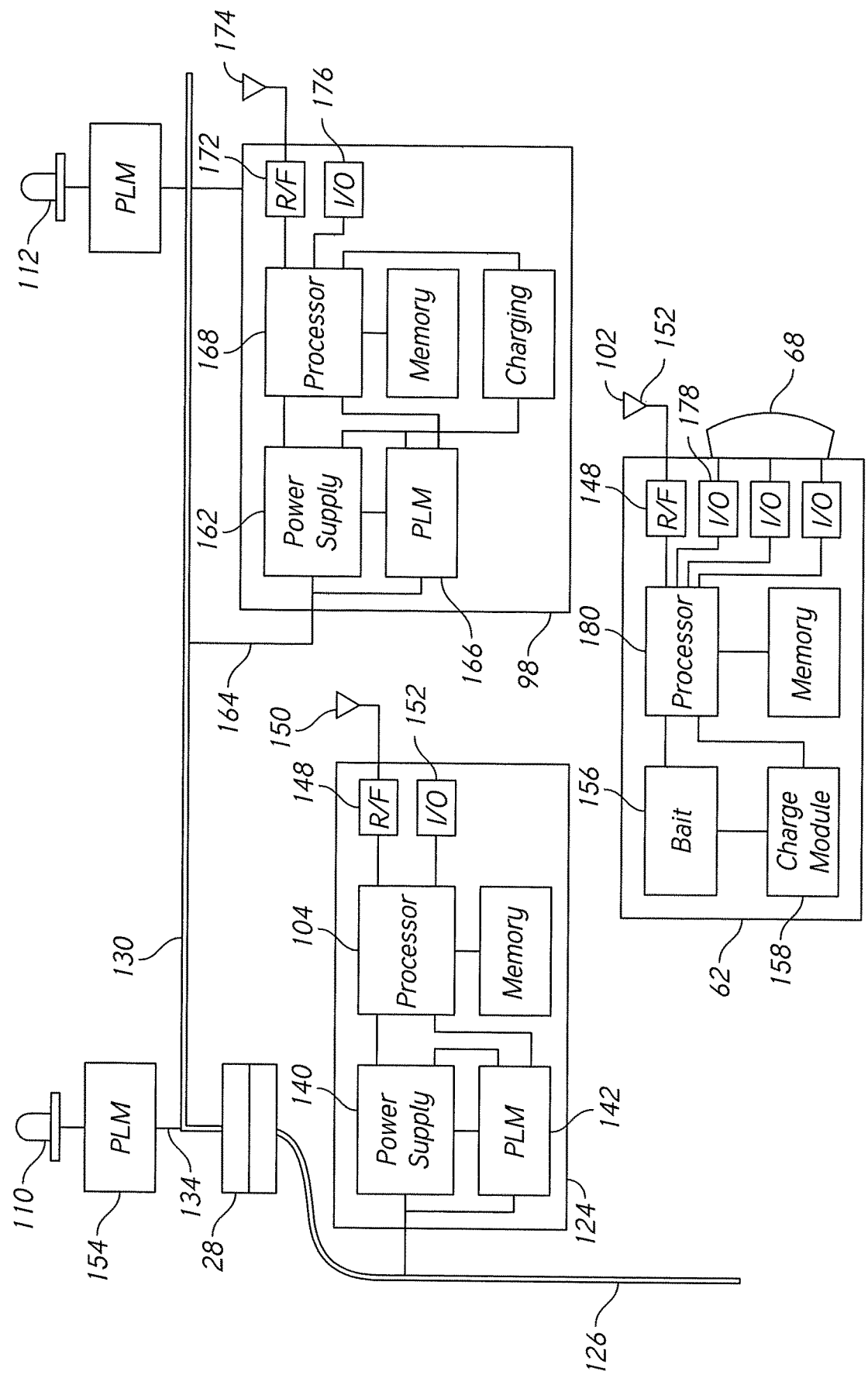
FIG. 14 is a block diagram showing some internal components of the inventive system and how they interact.

FIG. 14 provides a block diagram depicting some of the internal components of pivot system controller 124, UAV base station 98, and UAV 62. Line power is fed into power supply 140 within pivot system controller 124. This power supply feeds power to processor 104 and its associated memory. The processor 104 preferably has multiple I/O ports. One is dedicated to radio frequency module 148. This module can send and receive radio signals using antenna 150. Additional I/O ports 152 are provided. These can be connected to hard wired digital or analog communication lines.

Power line modulation unit 142 ("PLM unit") is also provided. As will be known by those skilled in the art a PLM unit can superimpose a digital data signal on a power line. A second PLM unit connected to the same power line can then use the superimposed digital data signal for two-way communications. PLM unit 142 can receive signals traveling on the power line ad send them to processor 104. PLM unit 142 can also receive signals from processor 104 and place them on the power line.

Power input line 126 travels to collector ring 28. The AC line power—along with any superimposed data signals—is transferred through a slip ring assembly to power line 130. GPS unit 110 (which resides on the axis of rotation for the pivot) has its own PLM unit 154. PLM unit 154 places digital signals containing the position determined by GPS unit 110 on power line 130. These signals are available to processor 104 via its associated PLM unit 142.

UAV base station 98 is likewise connected to power line 130 via power/data line 164. This feeds power to power supply 162, which feeds conditioned DC power to the other components such as processor 168 and charging unit 170 (used for inductive charging of the UAV). PLM unit 166 is able to send and receive data signals which travel along power line 130 (and power line 126). Thus, processor 168 is in communication with processor 104. Processor 168 preferably has multiple I/O ports. R/F module 172 can send and receive radio communications via antenna 174. Additional I/O ports 176 can be used for hardwired communication if desired.

UAV 62 is powered by battery 156. This battery is recharged (while the UAV is in the base station) via charge module 158. Processor 180 and its associated memory control the operations of the UAV. This processor also preferably has multiple I/O ports. R/F module 160 allows two-way radio communication with the UAV through antenna 102. Other I/O ports connect processor 180 to the various elements of sensor array 68 on board the UAV.

In studying the block diagram of FIG. 14, the reader will note the following attributes:
1. Pivot system controller is in hard-wired communication with the GPS units 110, 112 and UAV base station 98. Wireless communication can be used as well—if desired. Pivot system controller 124 can establish wireless communication with UAV 62, including while the UAV is in flight.
2. UAV base station 98 can wirelessly communicate with pivot system controller 124 and UAV 62—including while the UAV is in flight. In addition, the base station can communicate with pivot system controller 124 over a hardwired connection.
3. Pivot system controller 124 is configured to receive all the information it needs to calculate a current position for UAV base station 98. It can also calculate a future anticipated position for UAV base station 98 based on the current schedule of motion. A rate of change of the angle Θ can be actively controlled or can be calculated from the known maximum operating speed and a percentage of maximum currently being demanded.

The term "receiving position" means the position of the UAV base station at the time the UAV is in the landing process. This can be determined as a future anticipated position (such as when the anticipated UAV landing time is known and the future position of the boom assembly can be determined). It can also be a present position determined in response to a request from the UAV.

As described previously, the UAV will periodically make survey flights around the area serviced by the irrigation system—and possibly other nearby areas as well. During the time of its flight, the UAV base station will often move to a new location. Thus, it is not simply a matter of navigating the UAV back to the point from which it launched. The general principles of the present inventive process can be described as follows:
1. Determine a present position for the UAV base station;
2. Communicate that present position to the UAV;
3. Have the UAV use the communicated present position for the base station to maneuver to a position approximately over the base station; and
4. Have the UAV use its vision system or other systems to provide precise position information so that it can land on a desired position on the UAV base station.

There are many potential ways in which this could be carried out.

Example One

In looking again at FIG. 14, the reader will recall that wireless communication with UAV 62 is provided. When the drone is completing its planned survey route, the drone requests the present position of the UAV landing platform. This request can be made to the UAV base station (which relays it using the PLM units to processor 104 in pivot system controller 124) or directly to pivot system controller 124. Pivot system controller 124 then determines the present value for the angle Θ, retrieves the stored value for the radius R, and calculates the present latitude and longitude of the UAV base station 98. These coordinates are then sent to UAV 62 (either directly or via relay through the UAV base station).

UAV 62 uses the received coordinates to maneuver over the position of UAV base station 98. The UAV then uses its own sensors to precisely descend onto the UAV landing pad. As an example, the UAV can employ its own vision system to align itself with targets 82 on the landing pad (see FIG. 5). The UAV can also use its altitude ranging system to direct the landing (once it is close to the pad).

The reader should note that the position calculations for the UAV base station can just as easily be carried out by processor 168 in the base station or processor 180 on the UAV itself Provided that the needed information is communicated to the processor performing the work, it does not matter where the calculations are performed.

Example Two

It is possible to provide an anticipated position of the UAV base station at a given future time. Pivot system controller 124 typically runs a programmed irrigation schedule. It can therefore anticipate a value for the angle Θ at a future time. In fact, sophisticated pivot system controllers can actually drive the controls to produce a given value for the angle Θ at a given time.

UAV 62 may also be programmed to fly a specific schedule. In those instances, the UAV has a time when it finishes its survey and returns to the base station. It is useful—for purposes of routing the UAV—to know the anticipated landing time and the anticipated position for the UAV base station at that time. In this example both a future landing time and a future UAV base station position for that time are determined. This information is communicated to the UAV while it is still distal to the base station. The UAV then maneuvers so that it arrives over the anticipated position at the time of landing.

Example Three

The UAV can even be employed to correct the position of drive towers within the boom assembly. As in the prior examples, the position of the UAV base station is determined at the time of landing and the UAV is maneuvered over that position. The UAV then descends to a point where its vision system can be used to verify the position of the UAV base station. Some error in position will often be present. However, if one assumes the GPS-determined position of the UAV to be accurate—a good assumption if WAAS is used or if a reference station is created by precisely surveying the fixed position of GPS unit 110 and a correction signal is sent to the UAV—then the UAV can remain in a fixed hover and transmit the error measured by its vision system to pivot system controller 124. Pivot system controller 124 then energizes one or more drive towers to reposition the boom assembly and eliminate the error. Essentially, the pivot system controller drives the boom assembly under the position of the UAV.

Figure 15:
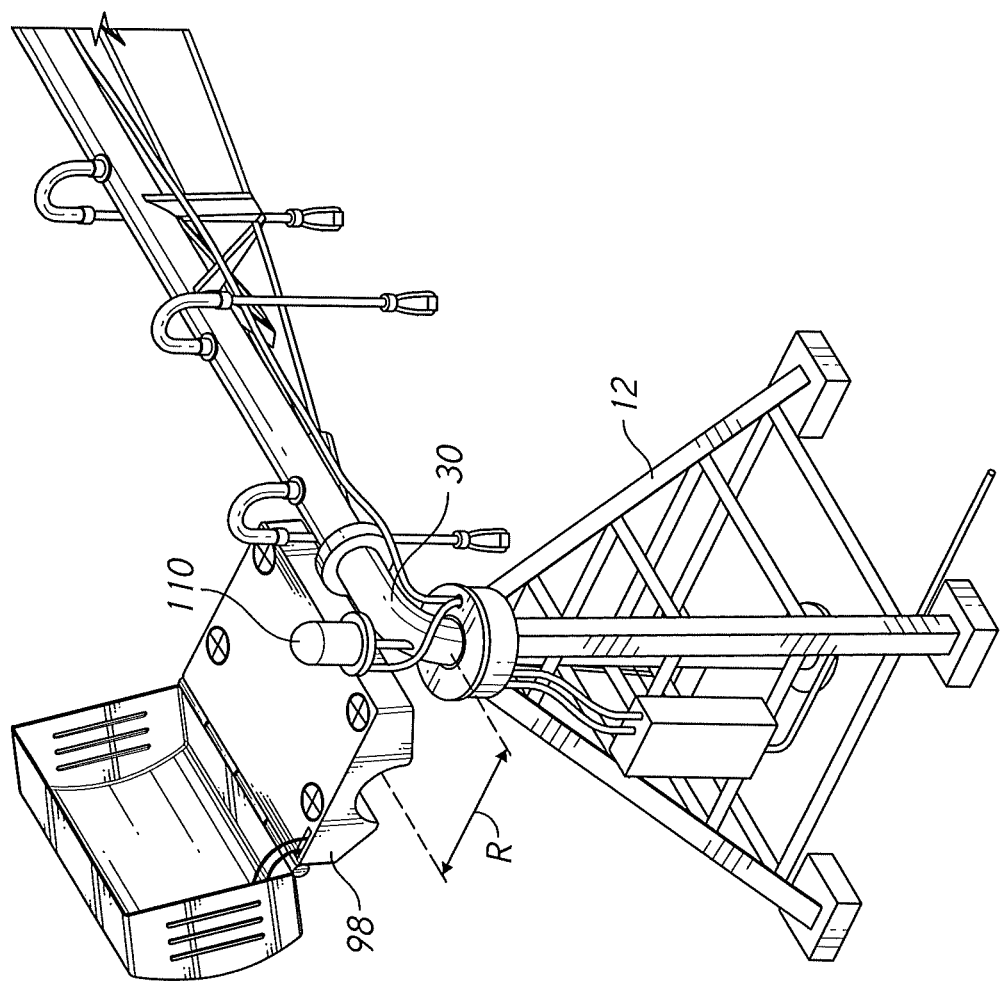
FIG. 15 is a perspective view, showing an embodiment where the UAV base station is mounted near the central pivot structure.

FIG. 15 shows another variation on the mounting of the UAV base station. In this example UAV base station is mounted directly to elbow 30 on central pivot structure 12. One might wish to mount the UAV base station directly over the pivot axis, but this would interfere with the desired location of GPS unit 110. Thus, the UAV base station is again offset laterally. The value for R is again measured and stored (though in this case it is very small). The reader will note that the angle needed for the determination of the position of the center of the UAV landing pad is no longer Θ but rather Θ plus an additional angular offset of 90 degrees. This is a simple matter to measure and include in the calculation of position. The position error of the UAV base station in the example of FIG. 15 will never be very large (since it mostly rotates around a fixed point). However, it is also important for the UAV to know the angular orientation of the landing pad in order to properly position itself for charging.

The reader should note that the operative system can include multiple center pivot irrigation systems. The pivot system controllers 124 in each of the center pivot systems can communicate with each other to maneuver the UAV(s) and boom assemblies. As an example, the controller 124 might maneuver the boom assemblies into close proximity so that a UAV can make a short flight from a base station on one boom assembly to a nearby base station on another boom assembly. Another example would be a UAV lifting off from one boom assembly and the system then directing the UAV to land on a UAV base station on another boom assembly that is actually closer to the UAV's current airborne position.

Other options can be included as well. These include:
1. periodically calculating and broadcasting the present location of the UAV base station, rather than performing these calculations only when needed;
2. Placing a GPS receiver on the base station itself and using that information to determine and transmit its present location;
3. The sprinkler valves may be controlled wirelessly, with only the power signal being hard-wired;
4. A UAV stored in a UAV base station on one center pivot boom may be used to acquire data for one or more other separate center pivot irrigation circles (with the data acquired being loaded into a CPU/memory associated with the other center pivot system;
5. Digital video camera sensors may be used on the UAV to build an accurate visible-light map of the irrigation circle;
6. Determining the angle Θ using a rotary encoder in said collar ring 28 rather than GPS units.

The preceding description contains significant detail regarding the novel aspects of the present invention. It is should not be construed, however, as limiting the scope of the invention but rather as providing illustrations of the preferred embodiments of the invention. Thus, the scope of the invention should be fixed by the claims ultimately drafted, rather than by the examples given.

Having described my invention, I claim:

1. A method for operating a UAV from a center pivot irrigation system including a central pivot structure with an axis of rotation and a pivoting boom assembly pivotally connected to said central pivot structure, comprising:
    (a) providing a UAV base station mounted on said pivoting boom assembly, said UAV base station moving with said pivoting boom assembly;
    (b) providing said UAV, with said UAV being configured to operate from said UAV base station;
    (c) providing a first GPS unit proximate said axis of rotation;
    (d) providing a second GPS unit mounted on said boom assembly;
    (e) measuring a radius between said axis of rotation and said UAV base station;
    (f) using positional data from said first GPS unit and said second GPS unit to determine a present angle for said boom assembly;
    (g) using said radius and said present angle to calculate a receiving position for said UAV base station;
    (h) transmitting said receiving position to said UAV; and
    (i) maneuvering said UAV to a point above said receiving position in preparation for landing said UAV on said UAV base station.

2. The method for operating a UAV from a center pivot irrigation system as recited in claim 1, further comprising after said UAV is maneuvered to said point above said receiving position, using instruments on board said UAV to land said UAV on said UAV base station.

3. The method for operating a UAV from a center pivot irrigation system as recited in claim 1, further comprising:
    (a) determining a known position for said first GPS unit;

(b) comparing said known position or said first GPS unit against said positional data from said first GPS unit to determine a current positional error; and (c) applying said current positional error to positional data from said second GPS unit.

4. The method for operating a UAV from a center pivot irrigation system as recited in claim 1 wherein a receiving position for said UAV base station is periodically calculated and transmitted to said UAV.

5. The method for operating a UAV from a center pivot irrigation system as recited in claim 1, wherein said UAV requests a receiving position and said receiving position is determined and transmitted to said UAV.

6. The method for operating a UAV from a center pivot irrigation system as recited in claim 1, wherein said UAV base station is mounted proximate an elbow attached to said central pivot structure.

7. The method for operating a UAV from a center pivot irrigation system as recited in claim 2, further comprising:
(a) determining a known position for said first GPS unit;
(b) comparing said known position or said first GPS unit against said positional data from said first GPS unit to determine a current positional error; and
(c) applying said current positional error to positional data from said second GPS unit.

8. A method for operating a UAV from a center pivot irrigation system including a central pivot structure with an axis of rotation and a pivoting boom assembly pivotally connected to said central pivot structure, comprising:
(a) providing a UAV base station mounted on said pivoting boom assembly, said UAV base station moving with said pivoting boom assembly;
(b) providing said UAV, with said UAV being configured to take off from said UAV base station and to land on said UAV base station;
(c) determining a position for said axis of rotation;
(d) providing a GPS unit mounted on said boom assembly;
(e) determining a radius between said axis of rotation and said UAV base station;
(f) using said determined position for said axis of rotation and positional data from said GPS unit to determine a present angle for said boom assembly;
(g) using said radius and said present angle to calculate a receiving position for said UAV base station;
(h) transmitting said receiving position to said UAV; and
(i) maneuvering said UAV to a point above said receiving position in preparation for landing said UAV on said UAV base station.

9. The method for operating a UAV from a center pivot irrigation system as recited in claim 8, further comprising after said UAV is maneuvered to said point above said receiving position, using instruments on board said UAV to land said UAV on said UAV base station.

10. The method for operating a UAV from a center pivot irrigation system as recited in claim 9, further comprising:
(a) wherein said GPS mounted on said boom assembly is a second GPS unit;
(b) providing a first GPS unit on said axis of rotation;
(c) comparing said determined position for said axis of rotation against positional data from said first GPS unit to determine a current positional error; and
(c) applying said current positional error to positional data from said second GPS unit.

11. The method for operating a UAV from a center pivot irrigation system as recited in claim 1 wherein a receiving position for said UAV base station is periodically calculated and transmitted to said UAV.

12. The method for operating a UAV from a center pivot irrigation system as recited in claim 8, wherein said UAV requests a receiving position and said receiving position is determined and transmitted to said UAV.

13. The method for operating a UAV from a center pivot irrigation system as recited in claim 8, wherein said UAV base station is mounted proximate an elbow attached to said central pivot structure.

14. The method for operating a UAV from a center pivot irrigation system as recited in claim 8, further comprising:
(a) wherein said GPS mounted on said boom assembly is a second GPS unit;
(b) providing a first GPS unit on said axis of rotation;
(c) comparing said determined position for said axis of rotation against positional data from said first GPS unit to determine a current positional error; and
(c) applying said current positional error to positional data from said second GPS unit.

15. A method for operating a UAV from a center pivot irrigation system including a central pivot structure with an axis of rotation and a pivoting boom assembly pivotally connected to said central pivot structure, comprising:
(a) providing a UAV base station mounted on said pivoting boom assembly at a fixed radius from said axis of rotation;
(b) providing said UAV, with said UAV being configured to take off from said UAV base station and to land on said UAV base station;
(c) determining a position for said axis of rotation;
(d) providing a GPS unit mounted on said boom assembly;
(e) using said determined position for said axis of rotation and positional data from said GPS unit to determine a present angle for said boom assembly;
(f) using said fixed radius and said present angle to determine a receiving position for said UAV base station;
(g) transmitting said receiving position to said UAV; and
(h) maneuvering said UAV to a point above said receiving position in preparation for landing said UAV on said UAV base station.

16. The method for operating a UAV from a center pivot irrigation system as recited in claim 15, further comprising after said UAV is maneuvered to said point above said receiving position, using instruments on board said UAV to land said UAV on said UAV base station.

17. The method for operating a UAV from a center pivot irrigation system as recited in claim 16, further comprising:
(a) wherein said GPS mounted on said boom assembly is a second GPS unit;
(b) providing a first GPS unit on said axis of rotation;
(c) comparing said determined position for said axis of rotation against positional data from said first GPS unit to determine a current positional error; and
(c) applying said current positional error to positional data from said second GPS unit.

18. The method for operating a UAV from a center pivot irrigation system as recited in claim 15 wherein a receiving position for said UAV base station is periodically calculated and transmitted to said UAV.

19. The method for operating a UAV from a center pivot irrigation system as recited in claim 15, wherein said UAV requests a receiving position and said receiving position is determined and transmitted to said UAV.

20. The method for operating a UAV from a center pivot irrigation system as recited in claim 15, wherein said UAV base station is mounted proximate an elbow attached to said central pivot structure.

* * * * *